United States Patent Office 3,321,922
Patented May 30, 1967

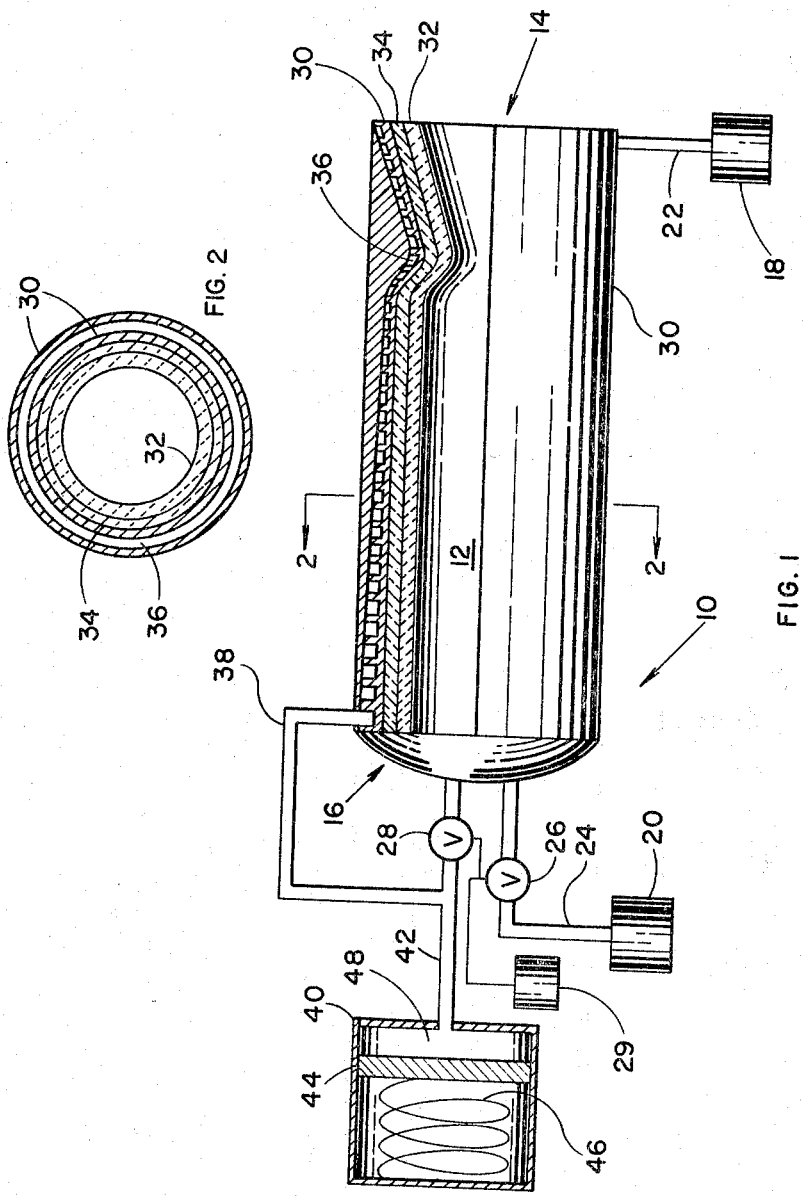

3,321,922
SMALL ROCKET ENGINE
William T. Latto, Jr., Lakewood, Ohio, assignor to the United States of America as represented by the Administrator of the National Aeronautics and Space Administration
Filed Oct. 29, 1964, Ser. No. 407,595
3 Claims. (Cl. 60—260)

The invention described herein may be manufactured and used by or for the Government of the United States of America for governmental purposes without the payment of any royalties thereon or therefor.

This invention is concerned with a regeneratively-cooled rocket engine that is small in size and has a relatively low thrust. More particularly, the invention relates to cooling the combustion chamber of a small rocket engine having the capability of restarting using non-cryogenic hypergolic propellants.

Small rocket engines, such as those having low thrusts of 1000 pounds or less, are difficult to cool because the ratio of the heated area to the volume of coolant is high compared to larger rocket engines having the same combustion characteristics. Regenerative cooling has been used with large rocket engines, but satisfactory cooling by this method becomes difficult to achieve as the engine size decreases. This cooling problem is further complicated by the fact that most small rocket engines in the 10 to 1000 pound thrust range are required to have restart capabilities so that they can perform attitude and trajectory control functions.

A typical large regeneratively-cooled rocket engine has a combustion chamber and nozzle formed by an assembly of tubes that are shaped to the proper configuration. One end of the tube assembly is in communication with an injector while the other end is connected to a supply of cryogenic propellant which acts as a coolant as it flows through the tubes, and provisions are made both for interrupting the propellant flow to stop the engine as well as for again initiating this flow for restarting. When the propellant flow through the injector stops, the cooling of the engine is interrupted because the propellant ceases to flow through the tube assembly.

While the use of cryogenic propellants for regenerative cooling is preferred because of their large heat-sink capacity, low-temperature operating problems and long term storage difficulties arise when these propellants are used. The use of certain non-cryogenic or storable propellants for regenerative cooling to alleviate the difficulties encountered with cryogenic propellants gives rise to the problem of dissipating the residual heat in the chamber materials after shutdown without causing violent decomposition of the propellant trapped in the cooling tubes. Flush systems to remove the entrapped propellant and intercoolers to lower the propellant temperature are complicated and expensive.

These problems and difficulties have been solved in the small thrust rocket engine of the present invention which has regenerative cooling passages formed in a high strength shell which encloses a refractory metal liner with an insulating liner between the outer shell and the inner liner. Adequate cooling is realized by providing an accumulator for receiving propellant from the regenerative cooling system after the propellant flow has been interrupted so that the propellant continues to flow through the regenerative cooling system. The propellant received by the accumulator is used when the engine is restarted. The improved regeneratively-cooled rocket engine of the present invention utilizes storable hypergolic propellants to achieve the necessary restart capabilities without being dependent upon a separate starting system or requiring low temperature operation.

It is, therefore, an object of the present invention to provide a small rocket engine which utilizes storable propellants and has an improved wall construction.

Another object of the invention is to provide an improved regenerative cooling apparatus for a small rocket engine having means for continuing the flow of propellant through the cooling apparatus after flow to the combustion chamber has been stopped.

A further object of the invention is to provide a small rocket engine having an improved wall construction for regenerative cooling using a storable propellant with provision for enabling the propellant to flow into an accumulator for a period of time after propellant flow to the engine combustion chamber has been interrupted so that a sufficient amount of heat from the chamber wall is absorbed to prevent decomposition of propellant in contact with the chamber wall.

Other objects of the invention will be apparent from the specification which follows and from the drawings in which like numerals are used throughout to identify like parts.

In the drawing:

FIG. 1 is an axial quarter-section view, with parts schematically illustrated, showing a small regeneratively-cooled rocket engine constructed in accordance with the invention; and FIG. 2 is a sectional view taken along the line 2—2 in FIG. 1.

Referring now to the drawings, there is shown in FIG. 1 a small rocket engine 10 that is constructed in accordance with the present invention. The engine 10 includes a combustion chamber 12 and a nozzle 14 which is oriented in the thrust direction along the longitudinal axis away from the combustion chamber. The engine 10 further includes an injector 16 at the opposite end of the combustion chamber 12 from the nozzle 14 for bringing storable hypergolic propellants, such as nitrogen tetroxide and hydrazine, from a plurality of sources into contact within the combustion chamber 12. These sources include a liquid fuel supply tank 18 and a liquid oxidizer supply tank 20 connected to the engine 10 by a fuel line 22 and an oxidant line 24 respectively. A suitable valve 26 in the line 24 shown schematically in FIG. 1 controls the flow of oxidant from the tank 20 to the injector 16 while a valve 28 controls the flow of fuel. An actuator 29 schematically shown in FIG. 1 is operably connected to the valves 26 and 28 for initiating and interrupting the propellant flow. The injector 16, valves 26 and 28, and the actuator 29 may be of the type described in copending application Ser. No. 182,692, filed Mar. 26, 1962 now Patent No. 3,170,286.

According to the present invention the small rocket engine 10 has an improved wall construction comprising an outer shell 30 enclosing an inner liner 32 with an intermediate liner 34 between them. The outer shell 30 is of a high strength material, such as stainless or high chrome steel. Cooling passages 36 are formed in the outer shell 30 for regenerative cooling. These passages are of variable height to provide adequate cooling.

The outer shell 30 may be fabricated in two parts with the cooling passages 36 being formed on the outer periphery of the inner portion in the form of a screw thread. This inner portion then is inserted in the outer portion with a suitable insert being provided at the throat of the nozzle 14. If desired, the passages could be formed on the inner surface of the outer portion of the shell 30 in the form of screw threads with the outer surface of the inner portion being smooth. Here again a suitable insert would be provided in the area of the throat of the nozzle 14.

The inner liner 32 is of a refractory metal, such as a tantalum-tungsten alloy or molybdenum. By way of example, an alloy comprising 80% tantalum and 20% tungsten may be used. The thickness of this liner depends on the structural requirements of the rocket engine 10, although it is contemplated that a thickness between 0.01 and 0.10 inch would be satisfactory for most applications.

The intermediate liner 34 is of a refractory insulating material, such as zirconia, zinc oxide, or alumina. The thickness of this liner depends upon the cooling design requirements with good insulation being of prime importance.

As shown in FIG. 1 the fuel line 22 is connected to the passages 36 at the downstream end of the nozzle 14. A fuel, such as hydrazine, is supplied under pressure to the passages 36 from the tank 18 for cooling the engine 10. The fuel leaves the passages 36 at the upstream end of the rocket engine 10 through a line 38 to the valve 28 that controls the supply of fuel to the nozzle 16.

In operation, the valves 26 and 28 are opened by the actuator 29 to start the engine 10. An oxidizer, such as nitrogen tetroxide, flows through the line 24 to the injector 16 and the fuel likewise flows through the line 38 to the injector where these propellants are injected into the combustion chamber 12. The refractory material of the liners 32 and 34 of the multilayer chamber wall forms a heat sink which is cooled by the fuel as it flows through the passages 36. When it is desired to stop the engine 10 the actuator 29 closes the valves 26 and 28 thereby interrupting the flow of the propellants to the injector 16.

An important feature of the invention is the provision of an accumulator 40 in the form of a chamber that is in communication with the line 38 through a by-pass conduit 42. A piston 44 in the accumulator chamber forms a wall that is mounted for reciprocable movement between an empty position shown in FIG. 1 and a filled position wherein the piston is located at the opposite end of the accumulator chamber. A spring 46 biases the piston 44 toward the by-pass conduit 42 to provide a minimum chamber volume 48 on the propellant receiving side of the piston. It will be appreciated that other types of resilient means, such as bellows, may be used to move the piston 44. It is further contemplated that a compressible fluid may be utilized to perform this function.

After the engine 10 has been stopped or deactivated by the closing of the valves 26 and 28 propellant fluid which is under pressure is transferred through the by-pass conduit 42 to the interior of the accumulator 40. This pressurized propellant moves the piston 44 against the biasing force exerted by the spring 46 toward the end of the accumulator 40 remote from the by-pass conduit 42 which increases the chamber volume 48 to a maximum value. In this manner pressurized fluid propellant continues to flow through the passages 36 for a period of time after the engine 10 has been deactivated, and this flow continues until the piston 44 has moved to the filled position with a maximum chamber volume. This provides adequate propellant flow through the passages 36 to absorb a sufficient quantity of heat from the engine wall so that the propellant trapped in these passages after this flow ceases does not become overheated.

When the valves 26 and 28 are reopened by the actuator 29 to restart the engine 10 the spring 46 moves the piston 44 toward the by-pass conduit 42 because of the system pressure loss as the propellants pass through the injector 16. This movement of the piston 46 expels the propellant from the accumulator 40 into the combustion chamber 12 through the injector 16.

The position of the piston 44 depends upon the difference between the pressure of the propellant in passages 36 and the pressure exerted by the spring 46. It is preferable that the spring pressure is sufficiently limited so that the spring 46 is fully compressed when the pressure in chamber volume 48 reaches that in the remainder of the system. It is also desirable for the spring 46 to exert a force great enough to move the piston 44 into contact with the accumulator wall adjacent the by-pass conduit 42 so that the chamber volume 48 is reduced to a minimum.

The accumulator 40 has a displacement that is adequate to permit enough propellant to flow through the passages 36 after the engine 10 has been deactivated to absorb the required quantity of heat from the engine wall. Because the propellant received by the accumulator 40 is returned to the system upon restarting the engine 10, no propellant is lost. Also no separate pressurization system is required for the accumulator 40 nor are additional valves used.

While a preferred embodiment of the rocket engine has been described, it will be appreciated that various structural modifications may be made without departing from the spirit of the invention or the scope of the subjoined claims. For example, while the passages 36 are shown in the form of screw threads it is contemplated that parallel passages may be used in larger engines, such as those having thrusts between 500 and 1000 pounds.

What is claimed is:

1. A rocket engine comprising,
 a combustion chamber and a nozzle in continuation thereof,
   said combustion chamber and nozzle having a wall including an outer layer of high strength material having cooling passages of variable heights therein, an intermediate liner of refractory insulating material selected from the group consisting of zirconia, zinc oxide, and alumina, and an inner layer of an alloy comprising 80% tantalum and 20% tungsten forming a heat sink,
 an injector closing the end of the combustion chamber opposite to said nozzle,
 said cooling passage forming regenerative cooling means surrounding said combustion chamber and nozzle to provide a flow path for regenerative cooling flow of a propellant fluid to said injector,
 a plurality of sources of supply of pressurized propellant fluid,
 first conduit means connecting one of said sources to said cooling passages,
 second conduit means connecting another of said sources directly to said injector,
 valve means in the flow path from each of said sources to interrupt propellant flow to said injector, one of said valve means being located between said cooling passages and said injector,
 an accumulator chamber for receiving a propellant,
 a bypass conduit having one end in communication with the interior of said accumulator chamber and the other end in communication with said cooling passages and said one valve means,
 a wall mounted for reciprocable movement in said accumulator chamber between a first position remote from said one end of said bypass conduit thereby providing a maximum volume in said accumulator chamber to a second position adjacent said one end of said bypass conduit thereby providing a minimum volume in said accumulator chamber, said bypass conduit serving to transfer pressurized propellant fluid to said accumulator chamber thereby exerting a pressure on said wall to move the same to said first position whereby continued flow of propellant fluid through said cooling passages is provided for a period of time after said engine has been deactivated to cool said heat sink, and
 resilient means within said accumulator chamber for biasing said movable wall from said first position to said second position, said resilient means serving to supply propellant to said injector by moving said wall to said second position when said one valve means is opened to reactivate said engine.

2. A rocket engine comprising,
 a combustion chamber and a nozzle in continuation thereof, said combustion chamber and nozzle comprising an outer layer of high strength material having cooling passages of variable heights therein, an intermediate liner of refractory insulating material selected from the group consisting of zirconia, zinc oxide, and alumina, and an inner layer of an alloy comprising 80% tantalum and 20% tungsten forming a heat sink, an injector closing the end of the combustion chamber opposite said nozzle, said cooling passages forming regenerative cooling means surrounding said combustion chamber and nozzle in said outer layer and providing a flow path for regenerative cooling flow of a propellant fluid, a plurality of sources of supply of propellant fluid, first conduit means connecting one source of supply to said cooling passages, second conduit means connecting another source of supply directly to said injector, valve means in the flow path from each of said sources of supply to interrupt flow to said injector head, an accumulator chamber, and bypass conduit means extending from said accumulator chamber to said one valve means and said cooling passages, said bypass conduit means serving to transfer propellant fluid from said one valve means to provide a continued flow of propellant fluid to said cooling passages for a period of time after said engine has been deactivated.

3. A composite wall for a rocket engine combustion chamber and nozzle comprising, an outer layer of high strength material having cooling passages of variable heights therein, an intermediate liner of refractory insulating material selected from the group consisting of zirconia, zinc oxide, and alumina, and an inner layer of an alloy comprising 80% tantalum and 20% tungsten.

References Cited
UNITED STATES PATENTS

| | | | |
|---|---|---|---|
| 1,860,891 | 5/1932 | Goddard. | |
| 2,476,185 | 7/1949 | Goddard. | |
| 2,548,485 | 4/1951 | Lubbock | 60—39.69 |
| 2,555,080 | 5/1951 | Goddard. | |
| 2,814,929 | 12/1957 | Morley et al. | 60—35.6 |
| 3,170,289 | 2/1965 | Kramer | 60—35.6 |
| 3,220,180 | 11/1965 | Heckert | 60—35.6 |

OTHER REFERENCES

Porter, H. B.: "Rocket Refractories," NavOrd Report 4893, NOTS 1191, PB 131503, 1955. Pages 14, 15, 22, 23 relied on.

MARK NEWMAN, *Primary Examiner.*

D. HART, *Assistant Examiner.*